US012781721B2

(12) United States Patent
Guender et al.

(10) Patent No.: US 12,781,721 B2
(45) Date of Patent: Nov. 3, 2026

(54) HYDRAULIC DRIVE FOR A HYDRAULIC CONSUMER ALTERNATELY PRESSURIZED IN OPPOSITE DIRECTIONS DURING OPERATION

(71) Applicant: Robert Bosch GmbH, Stuttgart (DE)

(72) Inventors: Andreas Guender, Ramsthal (DE); Henning Noack, Lohr am Main (DE); Johannes Schwacke, Bad Orb (DE); Ludwig Brandt, Goessenheim (DE); Rebecca Lacour, Rothenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 18/457,980

(22) Filed: Aug. 29, 2023

(65) Prior Publication Data

US 2024/0084829 A1 Mar. 14, 2024

(30) Foreign Application Priority Data

Sep. 14, 2022 (DE) ..................... 10 2022 209 608.8

(51) Int. Cl.
*F04B 9/113* (2006.01)
*F15B 3/00* (2006.01)
*F15B 7/00* (2006.01)

(52) U.S. Cl.
CPC ................. *F04B 9/113* (2013.01); *F15B 3/00* (2013.01); *F15B 7/006* (2013.01); (Continued)

(58) Field of Classification Search
None
See application file for complete search history.

(56) References Cited

U.S. PATENT DOCUMENTS 7,543,449 B2 * 6/2009 Ivantysynova ......... F15B 7/006 91/437
8,793,023 B2 * 7/2014 Vanderlaan ........... F15B 21/087 700/282
(Continued)

FOREIGN PATENT DOCUMENTS

DE 43 03 240 C2 8/1994
DE 11 2013 003 540 T5 4/2015
(Continued)

OTHER PUBLICATIONS

DE 102019220501 A1 machine translation to English from pe2esearch (Year: 2025).*

*Primary Examiner* — Michael Quandt
(74) *Attorney, Agent, or Firm* — Maginot, Moore & Beck LLP

(57) ABSTRACT

A hydraulic drive for a hydraulic consumer alternately pressurized in opposite directions during operation is disclosed. The hydraulic drive includes (i) first and second hydraulic power outputs, (ii) a hydraulic machine driven by an electric machine, said hydraulic drive comprising a first hydraulic working output which is connected to the first drive output via a first hydraulic line, and comprising a second hydraulic working output connected to the second drive output via a second hydraulic line, (iii) an infeed device which is configured to feed hydraulic fluid from a tank into the first and/or the second line in a pressure-dependent manner by way of an infeed line, and (iv) a outfeed device which is configured to selectively open or close a hydraulic connection between the first hydraulic line and a hydraulic outfeed line which is hydraulically connected to the tank in a controllable manner and a hydraulic
(Continued)

connection between the second hydraulic line and the hydraulic outfeed line to be selectively opened or closed in a controllable manner.

17 Claims, 5 Drawing Sheets

(52) U.S. Cl.
CPC ............... *F15B 2211/20515* (2013.01); *F15B 2211/20561* (2013.01); *F15B 2211/27* (2013.01); *F15B 2211/613* (2013.01); *F15B 2211/7053* (2013.01)

(56) References Cited

U.S. PATENT DOCUMENTS

| | | | | |
|---|---|---|---|---|
| 9,683,588 | B2 * | 6/2017 | Sadamori | F15B 7/006 |
| 11,788,560 | B2 * | 10/2023 | Rumpel | F15B 7/001 60/486 |
| 2005/0005600 | A1 | 1/2005 | Gandrud | |
| 2005/0246082 | A1 * | 11/2005 | Miki | F15B 11/17 701/50 |
| 2016/0265559 | A1 * | 9/2016 | Peterson | F15B 7/006 |

FOREIGN PATENT DOCUMENTS

| | | | | |
|---|---|---|---|---|
| DE | 102019209335 | A1 * | 12/2020 | F15B 21/00 |
| DE | 102019220501 | A1 * | 6/2021 | G06Q 99/00 |
| EP | 2 998 579 | B1 | 3/2016 | |

* cited by examiner

HYDRAULIC DRIVE FOR A HYDRAULIC CONSUMER ALTERNATELY PRESSURIZED IN OPPOSITE DIRECTIONS DURING OPERATION

This application claims priority under 35 U.S.C. § 119 to patent application no. DE 10 2022 209 608.8, filed on Sep. 14, 2022 in Germany, the disclosure of which is incorporated herein by reference in its entirety.

The present disclosure relates to a hydraulic drive for a hydraulic consumer alternately pressurized in opposite directions during operation, a compression device for fluids, and a hydraulically driven device.

BACKGROUND

Machines in which an element is moved alternately in opposite directions can be hydraulically driven. For example, piston compressors used to compress fluids (gases, liquids) can be provided with a double-acting hydraulic cylinder with two chambers supplied with pressurized hydraulic fluid so that a piston located between the two chambers is moved alternately in opposite directions. The chambers can be connected to a hydraulic drive, which has an electrically driven hydraulic pump and which is configured or can be controlled to pump hydraulic fluid back and forth between the chambers or between ports connected to the chambers.

SUMMARY

Proposed according to the disclosure are a hydraulic drive for a hydraulic consumer alternately pressurized in opposite directions during operation, a compression device for fluids, and a hydraulically driven device comprising the features set forth below. Advantageous embodiments are the subject matter of the description hereinafter.

The disclosure makes use of the measure of providing in a hydraulic drive, which by means of a hydraulic machine provides a hydraulic line via a first and a second line, an outfeed device which is configured to selectively open or close, in a controllable manner, hydraulic connections between the first line or the second line, respectively, and an outfeed line which is hydraulically connected to a tank. It is as a result possible to select switching timepoints at which to transition from the open state to the closed state, or vice versa, from the closed state to the open state such that optimum operation (e.g., short cycle time and/or high energy efficiency) can be achieved. In addition, the controlled switching states can be predicted (e.g., opening/closing at a defined pressure offset), in contrast to the switching states of conventional suction valves, for example, which have a dynamic behavior that can hardly be predicted due to pressure difference switching.

An infeed device is further provided which feeds hydraulic fluid from the tank into the first or second line in a pressure-dependent manner. In particular, the infeed device ensures that leakage from the hydraulic machine and other hydraulic components is compensated for, that the low-pressure side is charged to ensure correct suction conditions at the hydraulic machine, and that a volumetric flow is provided for cooling and filtering the hydraulic fluid. The expression "in a pressure-dependent manner" refers to the feeding being performed depending on the pressures of the hydraulic fluid in the infeed line, the first line, and the second line. In particular, depending on pressure differences between the infeed line and the first line or between the infeed line and the second line; i.e., a volumetric flow from the infeed line to the first or second line occurs when the pressure (infeed pressure) in the infeed line is higher than the pressure in the first or second line. The same applies to the optional feed into the outfeed line, meaning that the infeed device can optionally be configured to feed hydraulic fluid into the outfeed line as a function of pressure, with a volumetric flow occurring when the pressure (infeed pressure) in the infeed line is higher than the pressure in the outfeed line.

The term "line" (or synonymously hydraulic line or hydraulic line) generally means a line, passageway, or the like having at least two openings (hydraulic inlet, outlet, port, or the like) through which hydraulic fluid can flow into or out of the line. In a line, (at least) one active or passive hydraulic control element (e.g., valve) can be provided, which influences the flow of hydraulic fluid between the openings. In other words, a line can comprise several line segments, with a hydraulic element provided between two line segments. For the sake of linguistic simplification, the wording that hydraulic element (valve) is provided in the line is used.

The expression "hydraulic connection" or "hydraulically connected" is generally intended to mean that a volumetric flow of hydraulic fluid can take place between elements connected by a hydraulic connection (hydraulically connected), and here, too, a hydraulic control element (e.g., valve) can be provided in the hydraulic connection in order to control the volumetric flow. Hydraulically connected elements are thus connected by a line (in the above context).

The hydraulic machine can be variable, in particular variable through zero displacement (i.e., having variable displacement) or non-variable (i.e., having constant displacement). As is conventional, the term "displacement" refers to the volume of hydraulic fluid pumped through the hydraulic machine per revolution.

Optionally, the hydraulic connections between the first line and the infeed line or between the second line and the infeed line can be controlled independently. This can, e.g., be achieved by means of the following implementation.

Optionally, the outfeed direction comprises a first and a second outfeed valve, wherein the first outfeed valve is hydraulically connected to the first line and the outfeed line and has a closed-switch position in which no volumetric flow of hydraulic fluid is possible between the first line and the outfeed line, and an open-switch position in which a volumetric flow of hydraulic fluid is possible between the first line and the outfeed line, and wherein the second outfeed valve is hydraulically connected to the second line and the outfeed line and has a closed switching position in which no volumetric flow of hydraulic fluid is possible between the second line and the outfeed line and an open switching position in which a volumetric flow of hydraulic fluid is possible between the second line and the outfeed line.

Optionally, the first and the second outfeed valves can be controlled or actuated electrically and/or electromagnetically and/or hydraulically and/or pilot-controlled hydraulically. In particular, doing so enables control via an electronic controller, which is, e.g., configured to determine suitable switching timepoints and to produce predictable states.

A compression device according to the disclosure for media or fluids (i.e., gases, liquids, etc.), has a compression device with a double-acting hydraulic cylinder, which has a first and a second chamber, and a hydraulic drive according to the disclosure, whereby the first drive output is hydraulically connected to the first chamber and the second drive output is hydraulically connected to the second chamber.

A hydraulically driven device according to the disclosure, has a double-acting hydraulic cylinder with a first and a second chamber or a hydraulic motor with a first drive input and a second drive input and a hydraulic drive according to the disclosure, wherein the first drive output is hydraulically connected to the first chamber or the first drive input and the second drive output is hydraulically connected to the second chamber or the second drive input.

Additional advantages and embodiments of the disclosure result from the description and the enclosed drawings.

It is understood that the features specified hereinabove and the features yet to be explained hereinafter can be used not only in the respectively specified combination, but also in other combinations, or alone, without departing from the scope of the present disclosure.

The disclosure is thoroughly illustrated schematically in the drawings on the basis of exemplary embodiments and is described hereinafter with reference to the drawings.

DETAILED DESCRIPTION

Figure 1:
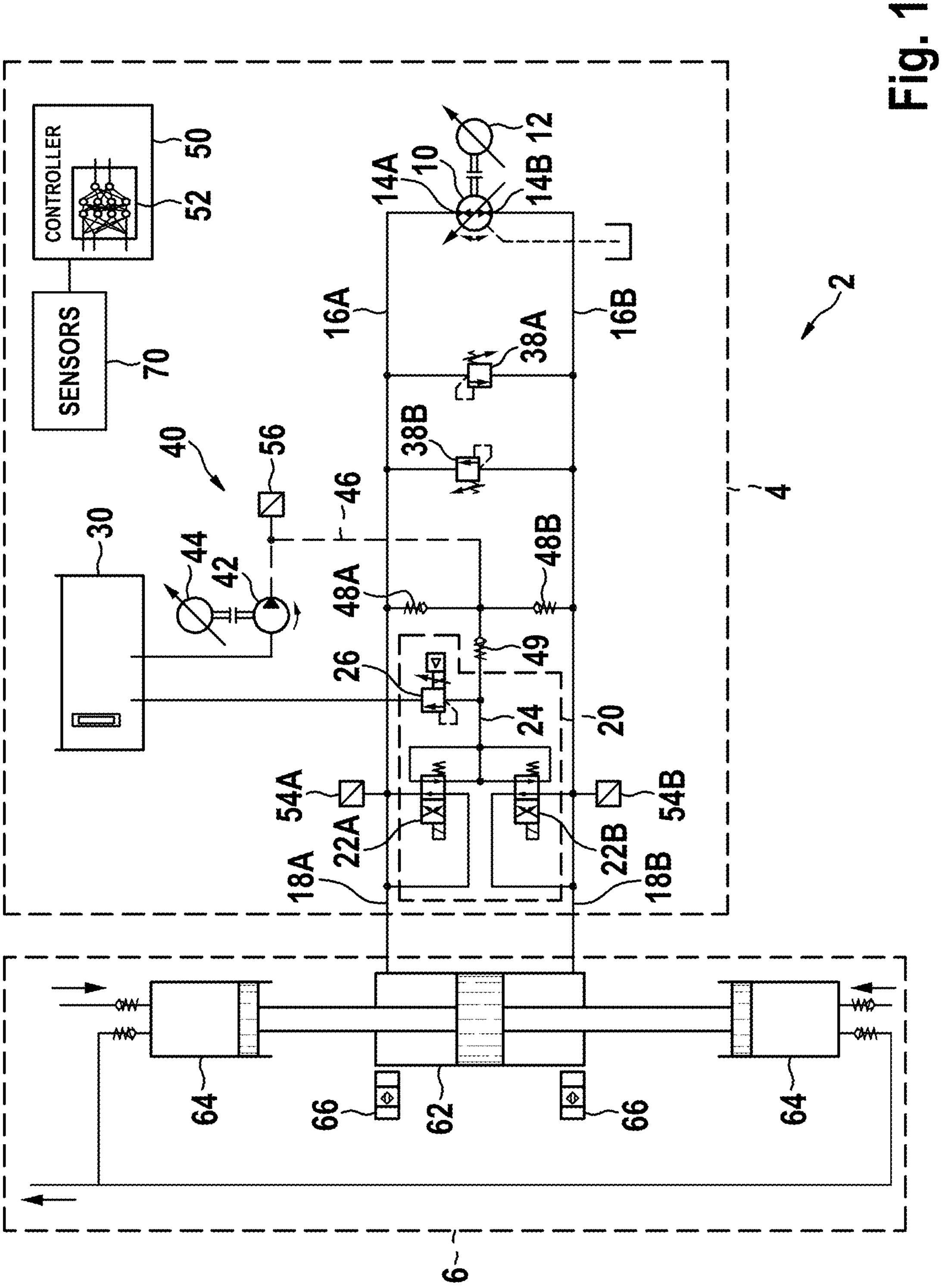
FIG. 1 shows an exemplary compression device with a hydraulic drive used to drive a piston compressor.

FIG. 1 shows a compression device 2 with a hydraulic drive 4, which is used as the hydraulic drive of a piston compressor 6. The compression device can be considered an example of a hydraulically driven device, although the hydraulic drive can of course also be used in other hydraulically driven devices.

The hydraulic drive 4 shown (also referred to as a hydraulic unit) further comprises a variable hydraulic machine 10, in particular one that is variable through zero (i.e., a hydraulic machine configured to act both as a hydraulic pump and as a hydraulic motor), which is driven by an electric machine 12 (which can be operated both as a motor and as a generator). The use of a non-variable hydraulic machine is also conceivable. The electric machine can also be understood as being part of the hydraulic drive. A first working output 14A of the hydraulic machine 10 is connected to a hydraulic first drive output 18A of the hydraulic drive 4 via a hydraulic first line 16A (this side is also referred to as the A side). A second working output 14B of the hydraulic machine 10 is connected to a hydraulic second drive output 18B of the hydraulic drive 4 via a hydraulic second line 16B (this side is also referred to as the B side). The hydraulic machine 10 can be, for example, an axial piston machine with a variable swing angle or variable displacement. The variable swing angle or variable displacement can be adjusted through zero, i.e., the direction of the volumetric flow of the hydraulic fluid (typically a hydraulic oil) through the hydraulic machine can be changed (while the direction of rotation of a drive shaft of the hydraulic machine or electric machine remains unchanged), so that (optionally, via corresponding control) the volumetric flow can take place from the A-side to the B-side, or from the B-side to the A-side. In the case of a non-variable hydraulic machine (e.g., constant hydraulic machine), i.e., having a fixed swing angle or fixed displacement, the machine can be driven at a variable rotational speed, in different directions of rotation in particular. So, at a fixed swing angle or fixed displacement, the direction of the volumetric flow of the hydraulic fluid (typically a hydraulic oil) can be changed by the rotational speed driving the hydraulic machine (given a variable direction of rotation of a drive shaft of the hydraulic machine or the electric machine), so that the volumetric flow can also optionally (by appropriate control) take place from the A-side to the B-side, or from the B-side to the A-side. The pressure of the hydraulic fluid in the first line 16A is also referred to as the A pressure, and the pressure of the hydraulic fluid in the second line 16B is also referred to as B pressure.

The hydraulic drive 4 is used to alternately pressurize a hydraulic consumer (e.g., as shown, a double-acting hydraulic cylinder 62) in opposite directions during operation, i.e., hydraulic fluid is intended to be alternately pumped via the first drive output 18A or the first line 16A to a first side (A-side) of the consumer, while simultaneously diverting hydraulic fluid from a second side (B-side) of the consumer via the second drive output 18B or the second line 16B, and pumped to the second side (B-side) of the consumer via the second drive output 18B and the second line 16B, respectively, while simultaneously diverting hydraulic fluid from the first side (A-side) of the consumer via the first drive output 18*a* and the first line 16A, respectively. For this purpose, in particular, the swing angle or the displacement volume of the hydraulic machine 10 is alternately variable through zero. Accordingly, the A side and the B side are alternately a low pressure side and a high pressure side.

Figure 4:
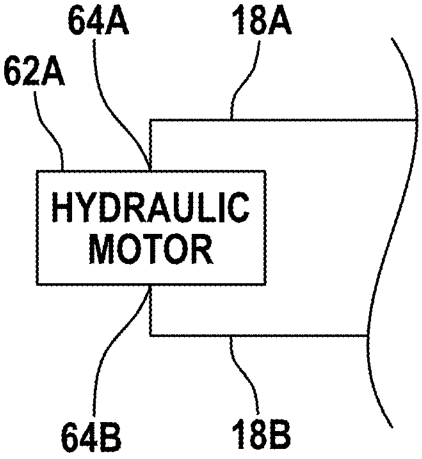
FIG. 4 shows an exemplary compression device in which the hydraulic drive drives a hydraulic motor.

Alternatively, as shown in FIG. 4, instead of a double-acting hydraulic cylinder 62, the hydraulic drive 4 may instead be connected to a hydraulic motor 62A with a first drive input 64A and a second drive input 64B. The first drive input 64A is hydraulically connected to the first drive output 18A and the second drive input 64B is hydraulically connected to the second drive output 18B.

The hydraulic drive 4 includes an outfeed device 20 configured to selectively open or close a hydraulic connection between the first hydraulic line 16A and a hydraulic outfeed line 24 in a controllable manner, and to selectively open or close a hydraulic connection between the second hydraulic line 16B and the hydraulic outfeed line 24 in a controllable manner. Since the outfeed device 20 is controllable, timepoints or periods during which hydraulic fluid is discharged from the hydraulic lines 16A, 16B can be specifically controlled.

The outfeed line 24 is hydraulically connected to a tank 30, wherein an in particular adjustable or controllable (e.g., electrically and/or electromagnetically and/or hydraulically and/or pilot-controlled hydraulically actuable) pressure relief valve 26 can be provided in the hydraulic connection to the tank 30. When the pressure relief valve 26 (outfeed pressure relief valve) is provided, hydraulic fluid is discharged from the outfeed line 24 to the tank 30 only when the pressure of the hydraulic fluid in the outfeed line 24 exceeds a certain or determinable (according to a control) pressure (referred to as the outfeed pressure). The pressure relief valve 26 can be dispensed with, for example, if the outfeed device 20 is controlled to switch the respective hydraulic connection to the outfeed line 24 to the open state only when the respective pressure of the hydraulic fluid of the first or second line 16A, 16B is above the outfeed pressure. The tank can be part of the hydraulic drive. Deviating from this, it is also conceivable that the tank is provided externally than is not part of the hydraulic drive.

In the example shown, the outfeed device 20 has controllable (e.g. electrically and/or electromagnetically and/or hydraulically and/or pilot-controlled hydraulically actuated switchable into specific switching states) outfeed valves which are designed as 4/2-way valves. A first outfeed valve 22A is hydraulically connected to, and configured to be hydraulically connected to, the first line 16A and the outfeed line 24 such that in an (open) switching state there is an open hydraulic connection between the first line 16A and the outfeed line 24, and in a (closed) switching state there is no open hydraulic connection between the first line 16A and the outfeed line 24 (i.e., the hydraulic connection is closed or prevented). A second outfeed valve 22B is hydraulically connected to, and configured to be hydraulically connected to, the second line 16B and the outfeed line 24 such that in an (open) switching state there is an open hydraulic connection between the second line 16B and the outfeed line 24, and in a (closed) switching state there is no open hydraulic connection between the second line 16B and the outfeed line 24 (i.e., the hydraulic connection is closed or inhibited). The two outfeed valves 22A, 22B can be controlled independently of each other. The two outfeed valves 22A, 22B can each be biased to the (closed) switching state.

Figure 5:
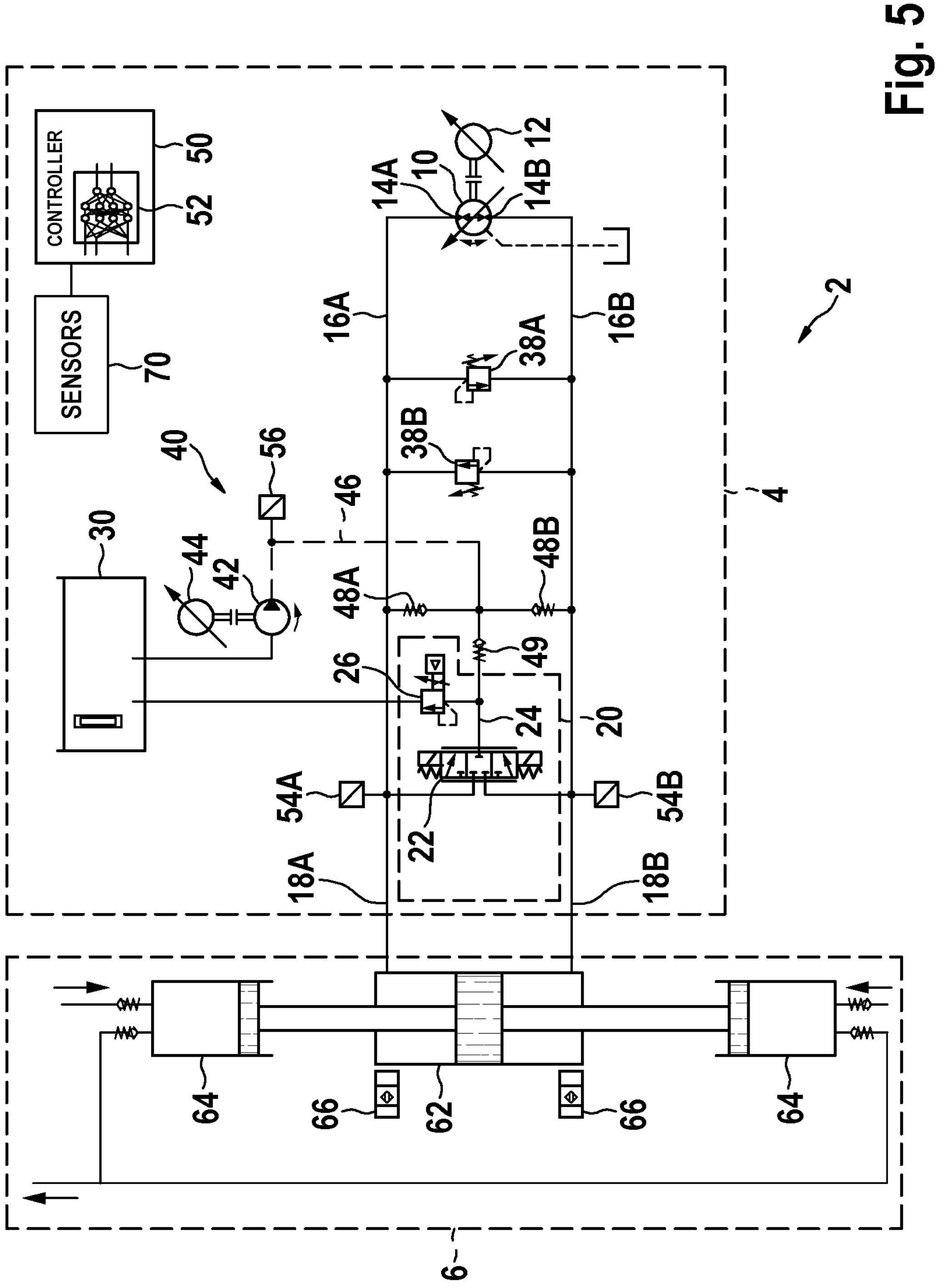
FIG. 5 shows an exemplary compression device with a hydraulic drive used to drive a piston compressor.
Figure 6A:
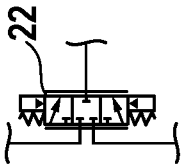
FIG. 6*a* shows an inset view of a pilot-controlled hydraulically controllable 3/3-way valve in the outfeed device of FIG. 6.
Figure 6:
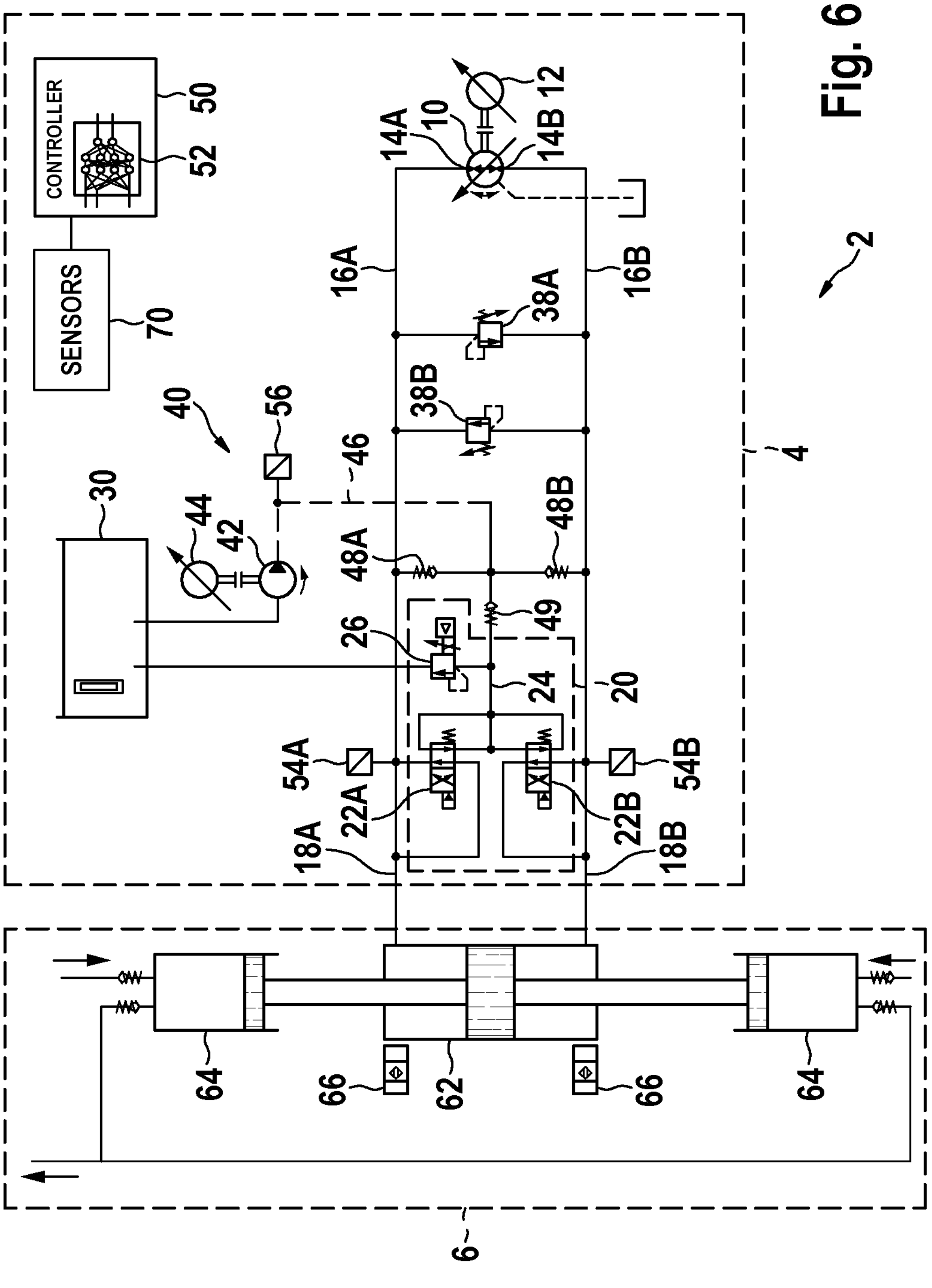
FIG. 6 shows an exemplary compression device with a hydraulic drive used to drive a piston compressor.

Instead of the 4/2-way valves shown (outfeed valves 22A, 22B), it is also conceivable to use other valves or a single other valve to implement the functionality of the outfeed device. For example, two electrically, and/or electromagnetically, and/or hydraulically, and/or pilot-controlled hydraulically controllable or actuable on/off valves (2/2-way valves) could be used (these are also controllable independently of each other). The use of a (single) electrically and/or electromagnetically and/or hydraulically and/or pilot-controlled hydraulically controllable or actuable 3/3-way valve 22 (FIG. 5) is also conceivable, with the 3/3-way valve being in a (neutral) switching position is, e.g. preloaded when there is no open hydraulic connection between the first and the second line 16A, 16B with the outfeed line 24, in another (A) switch position, which is, e.g., set electrically and/or electromagnetically (FIG. 5) and/or hydraulically and/or pilot-controlled hydraulically (FIG. 6*a*), there is an open hydraulic connection between the first line 16A and the outfeed line 24 and there is no open hydraulic connection between the second line 16B and the outfeed line 24 and, in a further (B) switch position, which is, e.g., electrically and/or electromagnetically (FIG. 5) and/or hydraulically and/or is set hydraulically with pilot control (FIG. 6*a*), there is an open hydraulic connection between the second line 16B and the outfeed line 24 and there is no open hydraulic connection between the first line 16A and the outfeed line 24.

The hydraulic drive 4 further includes a infeed device 40. The latter is configured to feed or introduce hydraulic fluid from the tank 30 into the A-side and/or the B-side as a function of pressure. The infeed device 40 provides hydraulic fluid at a predetermined pressure (referred to as infeed pressure) at a hydraulic infeed line 46. To this end, the infeed line 46 comprises, e.g., a hydraulic pump 42 (such as a fixed pump, as shown, although a variable hydraulic pump can also be used) which is driven by an electric motor 44. A suction side of the hydraulic pump 42 is hydraulically connected to the tank 30. A pressure side (pressure outlet) of the hydraulic pump 42 is hydraulically connected to the infeed line 46. The (predetermined) infeed pressure can be set, for example, by a corresponding pressure control of the infeed device 40, e.g. the hydraulic pump 42 or the electric motor 44.

The infeed line 46 is hydraulically connected to the first line 16A and the second line 16B, respectively, via check valves 48A, 48B (which can be considered part of the infeed device). In other words, the infeed device 40 is configured to inject hydraulic fluid into the first and/or the second line 16A, 16B when the pressure thereof is below the infeed pressure. During operation, this condition is typically the case at most for the low-pressure side. It can happen that the pressure of the hydraulic fluid in both lines 16A, 16B (the first and the second) is higher than the infeed pressure. Additionally, a check valve 49 can be provided connecting the infeed line 46 to the hydraulic outfeed line 24 so that hydraulic fluid is diverted to the outfeed line 24 when the pressure in the infeed line 46 exceeds that in the outfeed line 24.

A manner of flushing circuit is formed by the outfeed device 20, the tank 30, and the infeed device 40, which in particular enables filtering and cooling of the hydraulic fluid, e.g., by means of filtering and cooling devices provided on the tank. The infeed pressure can be selected so that there is a correct suction ratio at the hydraulic machine. The outfeed device 20 and the infeed device 40 (and tank) together form a feed device. When a hydraulic consumer is connected, it, the A-side, the B-side and the hydraulic machine form a working circuit. Overall, the rinsing circuit and the working circuit form a closed hydraulic system.

Furthermore, an (electronic) control unit 50 (e.g., a computing unit) is shown, which can be included in the hydraulic drive 4, in particular as shown, or can, e.g., also be part of a control unit of the compression device 2. The control unit 50 is configured to control the hydraulic drive 4, i.e., in particular to generate control signals for the elements (e.g., hydraulic machine 10, electric machine 12, outfeed device 20 or outfeed valves 22A, 22B, outfeed pressure relief valve 26, electric motor 44).

The controller can be configured to receive input variables from sensors 70 (which may include one or more temperature sensors, viscosity sensors, rotational speed sensors, and/or swing angle sensors), pressure sensors 54A, 54B, 56, and/or limit switches 66 based on which output variables (e.g., some of the control signals) are determined. Input variables are generally variables (measured values or the like) representing the state of the hydraulic drive 4 and/or a hydraulic consumer connected to the drive outputs 18A, 18B. For example, the former can be one or more of: A-pressure, B-pressure, pressure of the infeed (i.e., output pressure of the hydraulic pump), temperature and/or viscosity class of the hydraulic fluid, speed and/or swing angle of the hydraulic machine, cycle history. The latter can be, for example, signals from a position sensor (e.g. path sensor) and/or bearing sensor (e.g., end position sensor) of the consumer (e.g., hydraulic cylinder). For this purpose, a corresponding software module 52 can be provided in the control system, which in particular determines control signals or switching timepoints for the outfeed device 20, e.g., switching signals or switching timepoints for the outfeed valves 22A, 22B.

In particular, the software module 52 can be implemented as a machine learning-based algorithm (e.g., neural network). During a learning process, the switching timepoints of the outfeed valves 22A, 22B can be optimized, i.e., the timepoints of the transitions between open switching state and closed switching state, or between closed switching state and open switching state for each of the outfeed valves. The goal of the optimization can, e.g., be the shortest possible cycle time (using an appropriate cost function in the learning process).

Further, the hydraulic drive 4 can include pressure relief valves 38A, 38B arranged between the first and second hydraulic lines 16A, 16B acting in opposite directions. The pressure relief valve 38A can, e.g., be configured to limit the pressure of hydraulic fluid in first line 16A and, when a pressure threshold is exceeded, to switch via hydraulic actuation to an open condition in which hydraulic fluid is diverted to second line 16B. The pressure relief valve 38B can be correspondingly configured to limit the pressure of hydraulic fluid in second line 16B and, when a pressure threshold is exceeded, to switch via hydraulic actuation to an open condition in which hydraulic fluid is diverted to first line 16A. The pressure threshold at which the pressure relief valves 38A, 38B open can be adjustable or configurable as shown.

There can further be provided (independently of each other) a first pressure sensor 54A that measures or senses the pressure of the hydraulic fluid in the first line 16A (A pressure), a second pressure sensor 54B that measures or senses the pressure of the hydraulic fluid in the second line 16B (B pressure), and an infeed pressure sensor 56 that measures or senses the output side pressure of the hydraulic fluid of the hydraulic pump 42. Respective measurement signals or measured values can be transmitted from these pressure sensors 54A, 54B, 56 to the controller 50.

The piston compressor 6 (the design and function of which are known per se to the person skilled in the art) has a double-acting hydraulic cylinder 62 with two chambers, one chamber being hydraulically connected to the first drive outlet 18A of the hydraulic drive 4 and the other chamber being hydraulically connected to the second drive outlet 18B. The double-acting hydraulic cylinder 62 can be regarded as the hydraulic consumer of the hydraulic drive 4. The piston of the double-acting hydraulic cylinder 62 is connected via rods to pistons and compression pistons of two compression cylinders 64 to move them. During operation, a medium or fluid being compressed (gas, liquid, etc.) is alternately sucked in and compressed by each of the compression cylinders 64 via correspondingly arranged check valves, and the compressed medium or fluid is discharged via an outlet line (indicated by arrows).

Two or more limit switches 66 can be provided on the double-acting hydraulic cylinder 62, which are configured to detect or sense whether the piston of the double-acting hydraulic cylinder 62 has reached at least one predetermined position. When the at least one predetermined position is reached, the limit switches 66 can generate a corresponding signal, which is in particular transmitted to the controller 50. For example, the at least one predetermined position detected by the limit switches includes, at each end of the double-acting hydraulic cylinder 62, a position to decelerate the piston and a position for reversing the piston direction. A separate limit switch can be provided for each position.

Figure 2:
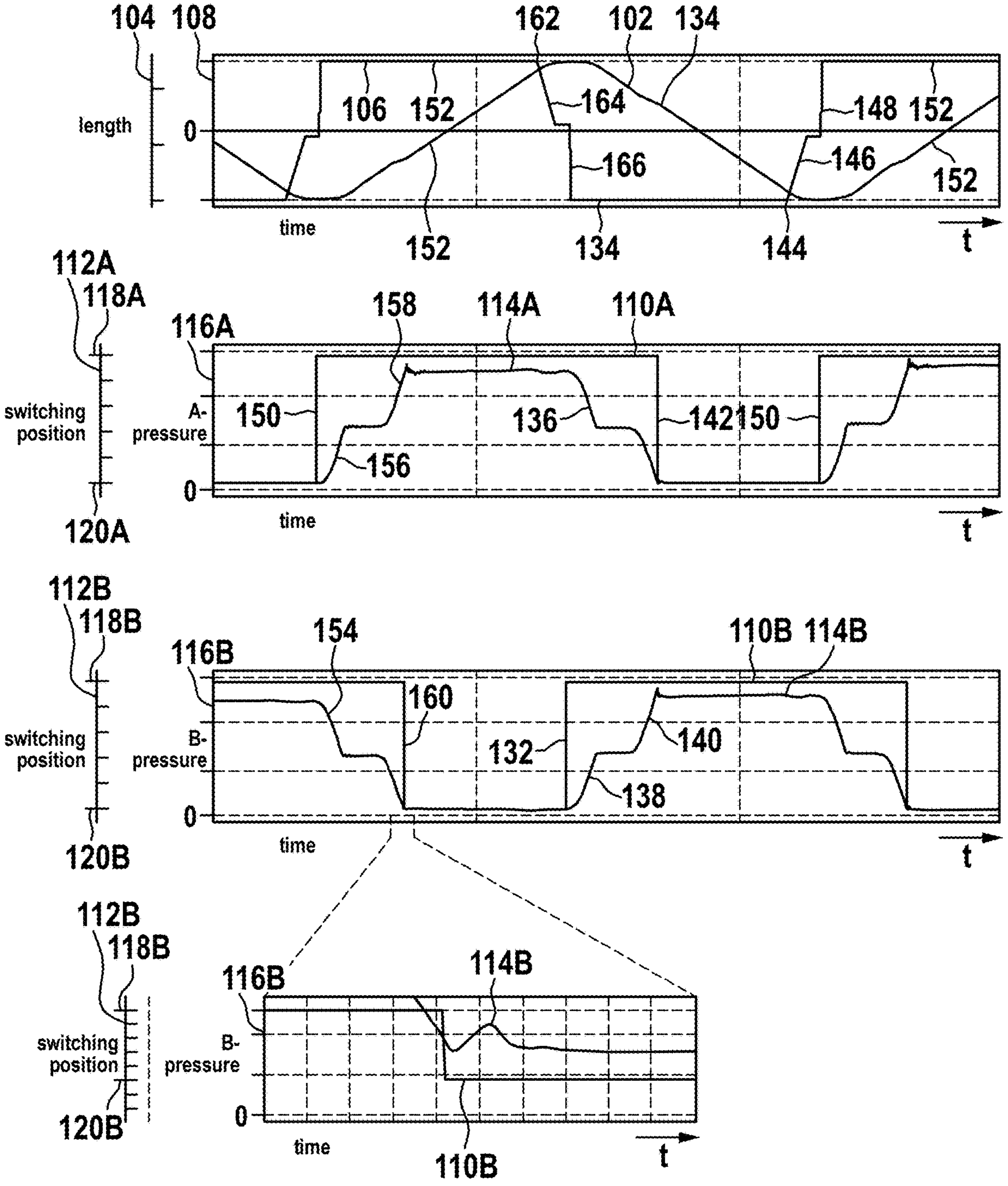
FIG. 2 shows different sizes of the hydraulic drive and the hydraulic consumer during a cyclic operating sequence using the example of the compression device in FIG. 1.

FIG. 2 shows different sizes of the hydraulic drive and the hydraulic consumer during a cyclic operating sequence using the example of the compression device in FIG. 1. The quantities are each plotted against time t (in any desired units, e.g. seconds).

In an upper partial drawing, the chronological profile of the deflection of the double-acting hydraulic cylinder, i.e., the deflection profile 102, is drawn in a deflection scale 104 or length scale (in any desired units, e.g. mm or cm) (the maximum deflection could be, e.g., in the range of 20 or 30 cm). Further, the chronological profile of the relative volumetric flow between the chambers of the double-acting hydraulic cylinder, i.e. the relative volumetric flow profile 106, is shown in a volumetric flow scale 108 (in any desired units, e.g. between −100% and +100%, where −100% or +100% corresponds to a maximum volumetric flow, and 0 corresponds to the situation that there is no volumetric flow between the chambers).

In a middle partial drawing concerning the A-side, the chronological profile of the switching position of the first outfeed valve 22A, i.e. the first outfeed valve profile 110A, and the chronological profile of the A-pressure (pressure of the hydraulic fluid in the first line 16A), i.e. the A-pressure profile 114A, are drawn. The switching position scale 112A has an upper switching state 118A, corresponding to the closed switching position of the first outfeed valve 22A, and a lower switching state 120A, corresponding to the open switching position of the first outfeed valve 22A. The A-pressure is plotted according to a pressure scale 116A (in any desired units, e.g. bar) starting from 0 and increasing upwards (a typical highest pressure reached could be, e.g., about 300 bar).

In a lower partial drawing concerning the B-side, the chronological profile of the switching position of the second outfeed valve 22B, i.e. the second outfeed valve profile 110B, and the chronological profile of the B-pressure (pressure of the hydraulic fluid in the second line 16B), i.e. the B-pressure profile 114B, are drawn. The switching position scale 112B has an upper switching state 118B, corresponding to the closed switching position of the second outfeed valve 22B, and a lower switching state 120B, corresponding to the open switching position of the second outfeed valve 22B. The B-pressure is plotted according to a pressure scale 116B (in any desired units, e.g. bar) starting from 0 and increasing upwards (a typical highest pressure reached could be, e.g., about 300 bar).

In addition, a section of the lower partial drawing is shown enlarged, with the dimensions having been rescaled. It can be seen in particular from the cutout that controlled cavitation protection is made possible by the hydraulic drive 4 with the described outfeed device 20.

In the following, the chronological sequences shown in FIG. 2 are briefly described as steps.

Step 132: Chamber B (i.e., the chamber of the double-acting hydraulic cylinder connected to the B side) is shut off towards the feed device, i.e. the second outfeed valve is switched to the closed switching state.

Step 134: Retraction, i.e., the hydraulic machine delivers a volumetric flow from chamber A (i.e., the chamber of the double-acting hydraulic cylinder connected to the A-side) or the feed device to chamber B (relative volumetric flow<0).

Step 136: The A pressure is reduced, initially until the pressure in the two chambers is approximately equal, and then it drops to the pressure level of the feed device (infeed pressure).

Step 138: The B pressure initially increases in line with the pressure reduction from chamber A until both pressures have the same level. The piston of the hydraulic cylinder is in this case moved without a load. The small pressure difference corresponds to the frictional forces.

Step 140: When the hydraulic cylinder enters the B-side load range, the B-pressure increases according to the counterforce from the compressor (e.g., up to 315 bar), while the A-pressure in turn decreases according to the compression volume required on the B-side.

Step 142: When the A pressure has reached the pressure of the feed device, chamber A is opened towards the feed device, i.e., the first outfeed valve is switched to the open switching state.

Step 144: The limit switch for deceleration is reached, braking follows.

Step 146: The volumetric flow into the B chamber is reduced to a safe level until the direction is reversed.

Step 148: The limit switch for direction reversal is reached, a direction reversal follows.

Step 150: Chamber A is shut off towards the feed device, i.e. the first outfeed valve is switched to the closed switching state.

Step 152: Extending, i.e., the hydraulic machine delivers a volumetric flow from chamber B or feed device to chamber A (relative volumetric flow>0).

Step 154: The B pressure is reduced, initially until the pressure in the two chambers is approximately equal, and then it drops to the pressure level of the feed device.

Step 156: The A pressure initially increases in line with the pressure reduction from chamber B until both pressures have the same level. Here, the hydraulic cylinder is moved without load. The small pressure difference corresponds to the frictional forces.

Step 158: If the hydraulic cylinder enters the A-side load range, A-pressure increases according to the counterforce from the compressor (e.g., up to 315 bar), while B-pressure in turn decreases according to the compression volume required on the A-side.

Step 160: When the B pressure has approximately reached the pressure of the feed device, chamber B is opened towards the feed device, i.e., the second outfeed valve is switched to the open switching state.

Step 162: The limit switch for deceleration is reached, braking follows.

Step 164: The volumetric flow is reduced to a safe level until the direction is reversed.

Step 166: The limit switch for direction reversal is reached, a direction reversal follows.

Figure 3:
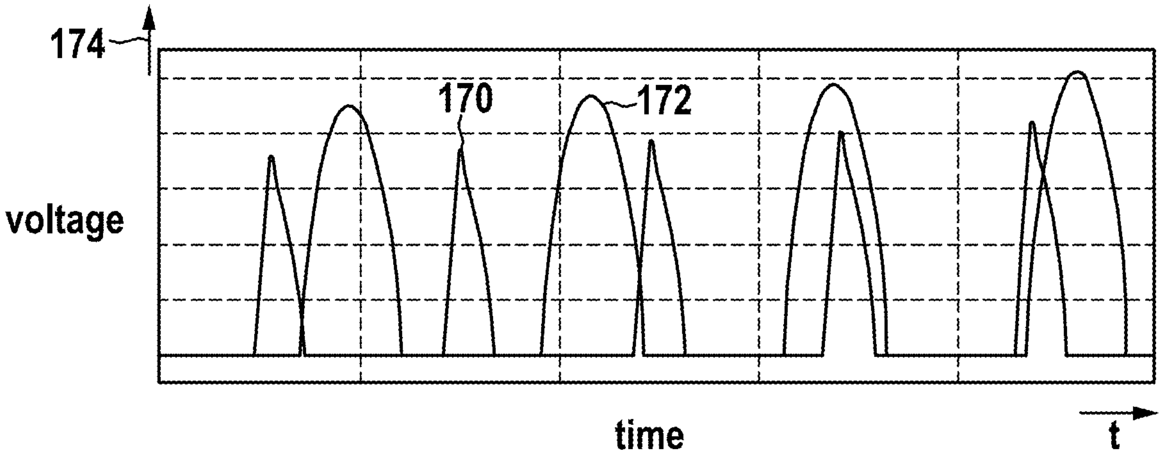
FIG. 3 shows the chronological profile of a DC link voltage over several operating cycles using the example of the compression device in FIG. 1.

FIG. 3 shows the chronological profile of a DC link voltage over several operating cycles, using the example of the compression device in FIG. 1. In this drawing, the DC link voltage 174 (in any desired units, e.g. V or kV) is plotted against time t (in any desired units, e.g. seconds). A chronological first voltage profile 170 of a hydraulic drive 4 according to the disclosure with the described outfeed device 20 and a chronological second voltage profile 172 of a hydraulic comparison drive are drawn. The comparative drive differs from the hydraulic drive according to the disclosure shown in FIG. 1 in that its outfeed device has a pressure-actuated 3/3-way valve 22 (FIG. 5) which, in one pressure-actuated position, opens the hydraulic connection of the first line 16A to the outfeed line, in another pressure-actuated position opens the hydraulic connection of the second line 16B to the outfeed line, and in a neutral position does not establish any hydraulic connection of the first line 16A and the second line 16B to the outfeed line. Pressure actuation is performed by hydraulically connecting corresponding actuating elements to the first and second lines 16A, 16B so that hydraulic fluid is diverted from the low pressure side to the outfeed line in each case.

The DC link voltage is, e.g., the DC voltage with which an inverter of the electrical machine is supplied with electrical power. The voltage spikes shown occur during periods when the electric machine is acting as a generator (just after a reversal of direction when hydraulic fluid is forced from the high pressure side through the hydraulic machine to the low pressure side, with the hydraulic machine acting as a hydraulic motor and driving the electric machine). In this drawing, it can be seen that the voltage peaks of the first voltage waveform 170 are lower and chronologically shorter than those of the second voltage waveform 172. In other words, fewer measures are required to absorb the corresponding electrical power, e.g., capacitors with lower capacity for intermediate storage of the electrical power or energy. It can also be seen that the cycle time of the hydraulic drive according to the disclosure is shorter than that of the comparative drive; this is in particular the result of the above-mentioned possibility of optimizing the switching timepoints of the outfeed valves accordingly.

What is claimed is:

1. A hydraulic drive for a hydraulic consumer alternately pressurized in opposite directions during operation, comprising:

a first hydraulic drive output port and a second hydraulic drive output port;

a hydraulic machine configured to be driven by an electric machine, said hydraulic machine comprising a first hydraulic working output port connected via a first hydraulic line to the first drive output port, and comprising a second hydraulic working output port connected via a second hydraulic line to the second drive output port;

an infeed device comprising an infeed pump configured to feed hydraulic fluid from a tank by way of an infeed line in a pressure-dependent manner into the first and/or the second line;

an outfeed device comprising at least one outfeed valve configured to selectively open or close in a controllable manner a first hydraulic connection between the first hydraulic line and a hydraulic outfeed line hydraulically connected to the tank, and to selectively open or close in a controllable manner a second hydraulic connection between the second hydraulic line and the hydraulic outfeed line; and an electronic controller configured to:

determine control signals for actuating the at least one outfeed valve via a machine learning-based algorithm that has been trained to optimize switching timepoints of the at least one outfeed valve with an optimization goal of reduced cycle time; and actuate the at least one outfeed valve according to the control signals.

2. The hydraulic drive according to claim 1, wherein:

the at least one outfeed valve comprises a first outfeed valve and a second outfeed valve, the first outfeed valve is hydraulically connected to the first line and the outfeed line and includes a closed-switch position in which no volumetric flow of hydraulic fluid is possible between the first line and the outfeed line, and an open-switch position in which volumetric flow of hydraulic fluid is possible between the first line and the outfeed line, and the second outfeed valve is hydraulically connected to the second line and the outfeed line and includes a closed-switch position in which no volumetric flow of hydraulic fluid is possible between the second line and the outfeed line, and an open-switch position in which a volumetric flow of hydraulic fluid is possible between the second line and the outfeed line.

3. The hydraulic drive according to claim 2, wherein the first hydraulic connection between the first hydraulic line and the hydraulic outfeed line and the second hydraulic connection between the second hydraulic line and the hydraulic outfeed line are independently controllable by the respective first and second outfeed valves.

4. The hydraulic drive according to claim 2, wherein the first and second outfeed valves are electrically, electromagnetically, hydraulically, or pilot hydraulically controllable or actuable.

5. The hydraulic drive according to claim 2, wherein the first and second outfeed valves are 4/2-way valves.

6. The hydraulic drive according to claim 1, wherein the electronic controller is configured to determine the control signals via the machine learning-based algorithm to optimize the switching timepoints with the optimization goal of reducing the cycle time based on one or more of: a pressure of the hydraulic fluid in the first line, a pressure of the hydraulic fluid in the second line, a pressure of the hydraulic fluid in the infeed line, a temperature and/or a viscosity class of the hydraulic fluid, a rotational speed and/or a swing angle of the hydraulic machine, an operating cycle history, signals of at least one position sensor, and/or at least one bearing sensor of the hydraulic consumer.

7. The hydraulic drive according to claim 6, wherein:

the at least one outfeed valve comprises a first outfeed valve and a second outfeed valve, the first outfeed valve is hydraulically connected to the first line and the outfeed line and features a closed-switch position in which no volumetric flow of hydraulic fluid is possible between the first line and the outfeed line, and an open-switch position in which volumetric flow of hydraulic fluid is possible between the first line and the outfeed line, the second outfeed valve is hydraulically connected to the second line and the outfeed line and features a closed-switch position in which no volumetric flow of hydraulic fluid is possible between the second line and the outfeed line, and an open-switch position in which a volumetric flow of hydraulic fluid is possible between the second line and the outfeed line, and the electronic controller is further configured to determine the switching timepoints for the first and second outfeed valves via the machine-learning algorithm with the optimization goal of reducing cycle times of the first and second outfeed valves.

8. The hydraulic drive according to claim 1, further comprising a pressure relief valve provided in the outfeed device or between the outfeed line and the tank.

9. The hydraulic drive according to claim 1, further comprising:

a first pressure sensor configured to measure the pressure of hydraulic fluid in the first line; and/or a second pressure sensor configured to measure the pressure of hydraulic fluid in the second line.

10. The hydraulic drive according claim 1, wherein:

the infeed line is hydraulically connected to the first line via a first check valve, and the infeed line is hydraulically connected to the second line via a second check valve.

11. The hydraulic drive according to claim 1, wherein the infeed line is hydraulically connected to the outfeed line via a check valve.

12. The hydraulic drive according to claim 1, wherein the infeed device comprises a hydraulic pump driven by an electric motor, said pump having a suction side hydraulically connected to the tank and is an output side hydraulically connected to the infeed line.

13. The hydraulic drive according to claim 1, further comprising:

a first adjustable pressure relief valve provided between the first line and the second line in order to limit the pressure of hydraulic fluid in the first line, and a second adjustable pressure relief valve provided between the second line and the first line in order to limit the pressure of hydraulic fluid in the second line.

14. A compression device for fluids, comprising:

a compression device comprising a double-acting hydraulic actuator having a first chamber and a second chamber; and the hydraulic drive according to claim 1, wherein the first drive output is hydraulically connected to the first chamber, and the second drive output is hydraulically connected to the second chamber.

15. A hydraulically driven device, comprising:

a double-acting hydraulic actuator having a first chamber and a second chamber or a hydraulic motor having a first drive input port and a second drive input port; and the hydraulic drive according to claim 1, wherein the first drive output port is hydraulically connected to the first chamber or the first drive input port, and the second drive output port is hydraulically connected to the second chamber or the second drive input port.

16. The hydraulic drive according to claim 1, wherein the machine learning-based algorithm is a neural network.

17. The hydraulic drive according to claim 1, wherein the machine learning-based algorithm has been trained to optimize the switching timepoints of the at least one outfeed valve via a cost function with the optimization goal of reduced cycle time.

* * * * *